Dec. 19, 1922.
J. H. JACOBS.
PRESSURE COOKER LOCK.
FILED AUG. 3, 1921.
1,439,000.
2 SHEETS—SHEET 1.
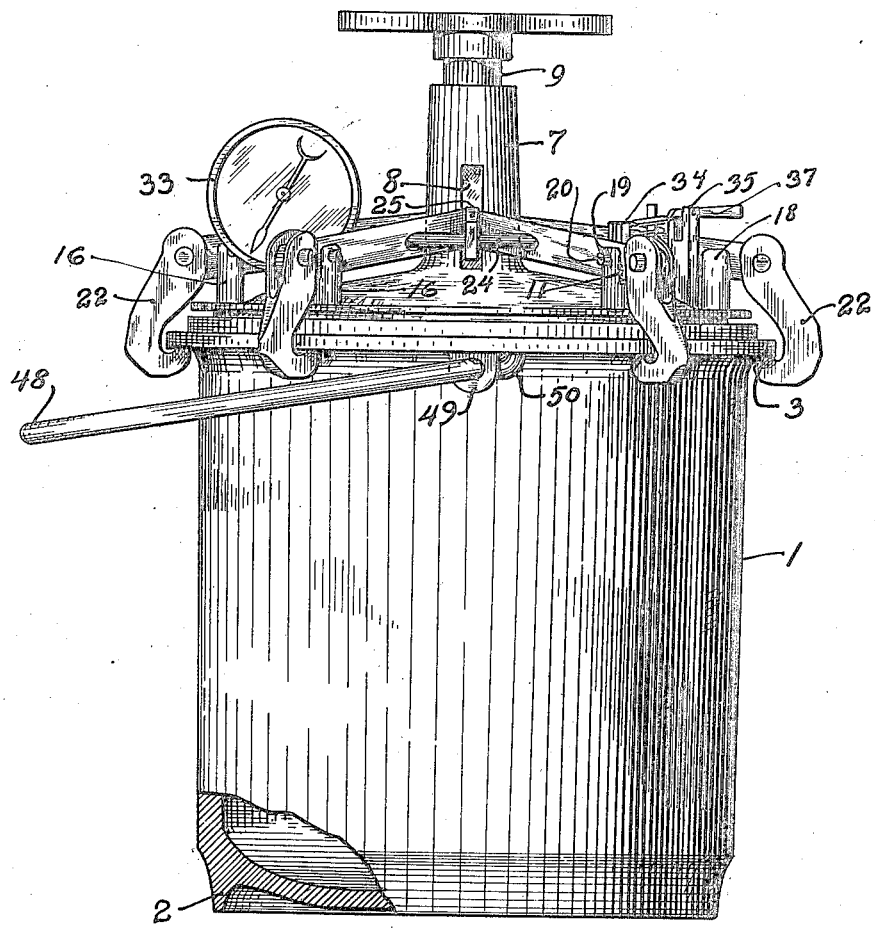
Fig. 1.
Inventor
Joseph H. Jacobs.
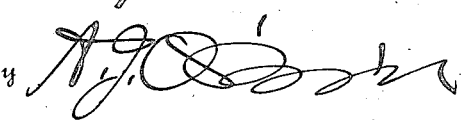
Attorney Dec. 19, 1922.
J. H. JACOBS.
PRESSURE COOKER LOCK.
FILED AUG. 3, 1921.
1,439,000.
2 SHEETS—SHEET 2.
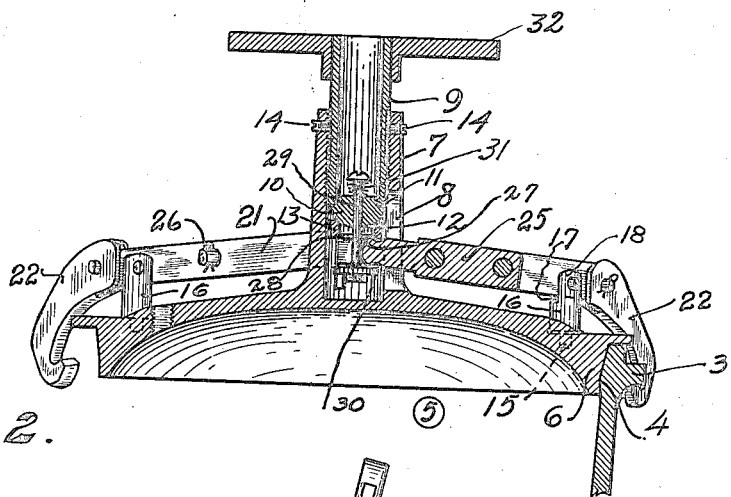
Fig. 2.
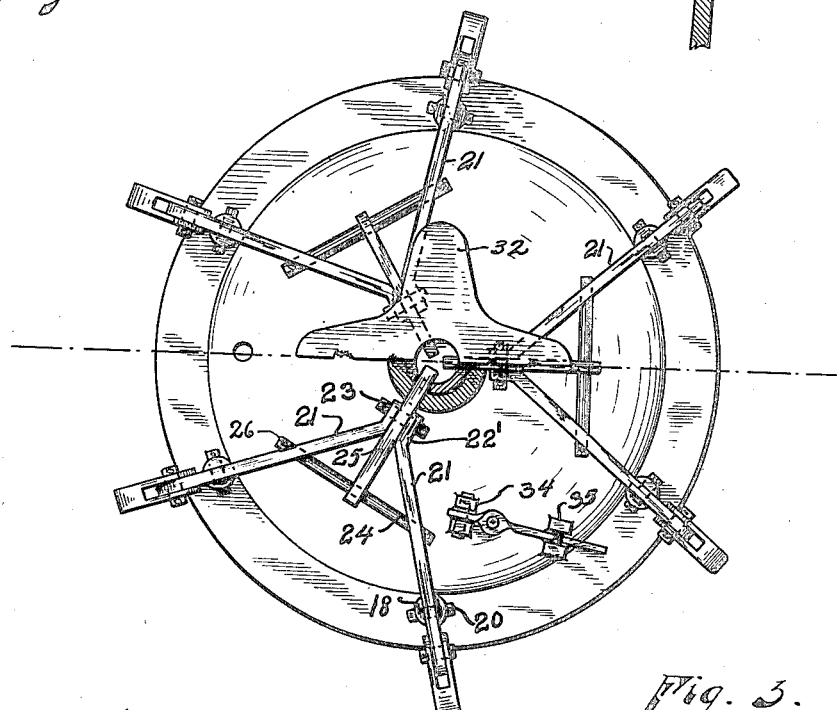
Fig. 3.
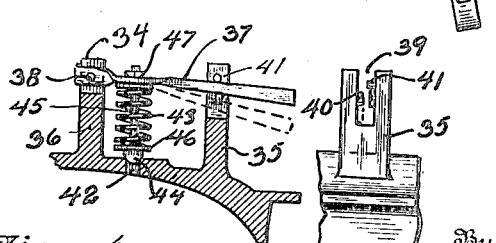
Fig. 4. Fig. 5.
Inventor
Joseph H. Jacobs.
By 
Attorney Patented Dec. 19, 1922.

1,439,000

UNITED STATES PATENT OFFICE.

JOSEPH H. JACOBS, OF DENVER, COLORADO.

PRESSURE-COOKER LOCK.

Application filed August 3, 1921. Serial No. 489,602.

*To all whom it may concern:*

Be it known that I, JOSEPH H. JACOBS, a citizen of the United States, residing in the city and county of Denver and State of Colorado, have invented certain new and useful Improvements in Pressure-Cooker Locks; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the art of pressure cookers and has special reference to means for locking the cover to the pot.

In pressure cookers it is customary to secure the cover to the pot by means of a plurality of bolts attached to lugs on the upper outer edge of the pot and engaging between spaced lugs carried by the cover: the bolts being provided with winged nuts by which the cover is forced against the pot. The above described securing means is open to several objections among which may be mentioned that when the pot is cast with lugs the unequal cooling tends to throw the lugs out of round and then the lugs are in the pot out of round and then the lugs are in the way when polishing, besides the above it always entails considerable labor to tighten and loosen six or more bolts every time the cooker is closed and opened.

It is the object of my invention to overcome the objections pointed out above and I have invented means for securing the cover to the pot that does not require the pot to be made with lugs but instead with a circular outwardly projecting flange which prevents unequal cooling and which does not interfere with the finishing. I have also invented a clamping means that cooperates with the flange and which comprises a plurality of flange engaging hooks that can be operated simultaneously.

In order to more clearly describe my invention I will refer to the accompanying drawings in which:

Fig. 1 is a side elevation of my improved cooker.

Fig. 2 is a partial section taken on line 2—2 Fig. 3.

Fig. 3 is a top plan view of my cooker with a part broken away.

Fig. 4 is a section taken on line 4—4 Fig. 3, and

Fig. 5 is an end elevation of Fig. 4.

In the drawings the same reference characters will be used to designate the same parts throughout the several views.

Numeral 1 represents the pot part of my improved cooker the same being provided on its bottom with an annular downwardly projecting flange 2 upon which the pot rests when standing on a plane surface. Around the upper edge of the pot is an outwardly projecting flange 3, the purpose of which will hereinafter appear. The inner upper edge of pot 1 is beveled as shown at 4 in Fig. 2. Cooperating with the pot is a cover 5 provided with a downwardly projecting flanged portion 6 which has its outer surface beveled to conform to the inner beveled portion 4 of the pot. The cover is arched upwardly, as shown, and on the central portion thereof I have provided an upwardly projecting tubular member 7 provided near its bottom with three equidistantly spaced slots 8. The upper portion of the tubular member 7 is internally threaded to receive the threaded tubular plug 9 which has secured to the lower end thereof, by means of screw threads, or otherwise, a plug 10 having shoulders 11 engaging the lower end of tubular member 9 and its spherical end 12 engaging a disk shaped member 13. To prevent plug 9 from being withdrawn from the tubular member 7, I provide one or more screws 14 which pass through the wall of member 7 and engage with plug 9 and acts as a stop when engaged by the screw threaded portion, which is of larger diameter.

For the purpose of securing the cover to the pot member I have provided the following means. At an even number of equidistant points around the periphery of the cover I drill holes 15, which, however, do not extend entirely through the metal. Holes 15 are then tapped. Into tapped holes 15 I insert pivot supporting plugs 16 which comprise short plugs of any suitable cross section having one end screw threaded to engage with the threads in holes 15, the other end being provided with a transversely cut notch 17, the sides 18 of which have opposed holes 19 for the reception of a pivot pin 20. Pivoted on each of said pins 20 is a lever 21 to the outer end of which is pivotally attached a hook 22 of suitable shape and size to engage with the flange 3. The inner end of lever 21 is bent, as indicated at 22' and provided with an opening for the reception of pin 23. Between the pivot 20 and the bent end 22, lever 21 is provided with another opening for the reception of pin 24. The inner ends of each group of two levers are brought towards each other until each contacts with a side of bar 25 which has one end inserted within a slot 8 in the tubular member 7 and is provided with holes for the reception of pins 23 and 24, all as clearly shown in Fig. 3. Pins 23 and 24 pass through the two levers 21 and the bar 25 and are provided at their ends with holes and cotter pins 26. The holes in members 21 and 25 which receive pins 24 and 25 are larger in diameter than the pins: this permits relative movement between the several members of the assembly for a purpose which will hereinafter appear.

The inner ends of levers 25 which project through the slots 8, have their ends rounded as indicated at 27. The lower edge 28 of dished member 13 engages the upper curved surface of bar ends 27. A screw 29 passes through a hole in plug 10, extends through member 13 and projects below the lower curved surface of ends 27 where it supports a washer 30 against the curved surfaces 27. A spring 31 is provided between the head of screw 29 and the top of plug 10 for the purpose of yieldingly holding washer 30 against surface 27. The upper end of tubular plug 9 is provided with a hand grip 32 whereby plug 9 may be rotated.

There are half as many assemblies of levers 21 and bars 25 as there are pivot supporting plugs 16 but as they are all alike, I have described only one of them.

The cover is provided with the usual pressure gage 33 and with a safety valve 34 which is shown in section in Fig. 4. Safety valve 34 comprises two projecting portions 35 and 36 whose upper ends are slotted to receive a lever 37; a pin 38 passes through the upper end of projecting portion 36 and forms a pivot for the lever 37 whose other end is movable in slot 39 of projection 35. Slot 39 is provided with two projections or stops 40 and 41 against which lever 37 engages. A hole 42 extends through the cover between projecting portion 35 and 36. A pin 43 has a spherical or semi-spherical head 44 which engages in the hole 42. A spring 45 whose lower end rests upon a washer 46 and whose upper end engages with lever 37 holds the spherical head resiliently against the upper edge of hole 42 and closes the same steam tight. Should the pressure become excessive it will compress spring 45 slightly and permit the steam to escape. When full pressure is desired lever 37 is hooked beneath projection 40 and when a small pressure is sufficient it is moved up against projection 41. A collar 47 or other equivalent means prevents pin 43 from dropping out of lever 37. The pot member 1 is provided with a bail 48 which is pivoted to eyelets 49. One end of said bail has an extension 50 which engages with the lower side of flange 3, when the bail is on one side. By this means the bail 48 can be held out of contact with the pot and kept comparatively cool.

The operation of my device is as follows: When it is desired to apply the cover to the pot, member 32 is turned and tubular member 9 rotated in a direction to move the same upwardly. Washer 30 carries the inner ends 27 of bars 25 upwardly and causes the outer ends of levers 21 and hooks 22 to move downwardly. Hooks 22 are usually thrown upwardly and inwardly on levers 21 until the cover is put in place, the hooks are then turned downwardly and hooked underneath flange 3. Tubular member 9 is now rotated in a direction to move it downwardly, this causes the dish-shaped member 28 to move the ends 27 of bars 25 downwardly and rotate levers 21 about pivots 20 in such a direction that the hooks 22 are carried upwardly and engage the under surface of flange 3. When the hooks engage the lower surface of flange 3 any further movement will cause the cover to be pressed down onto the pot with a force equal to the total force exerted by tubular member 9 on the ends of bars 25 multiplied by the lever arm ratios, and can naturally be made as great as may be desired, within reasonable limits. If for any reason the adjustment should be such that one hook of a pair engages before the other, then the loose connection between bar 25 and levers 21 will permit such relative adjustment of these members that the two hooks will finally engage the flange surface with substantially equal force. If the relative adjustment of the various sets or assemblies is different the dish-shaped member 13 will pivot on the spherical end 12 of plug 10 so as to equalize the pressure exerted by each set. In the manner pointed out, each hook of a set exerts substantially the same force and each set exerts substantially the same force thus assuring a uniform pressure radially distributed. Where bolts are used, there is no way of telling when the pressure exerted by each bolt is the same.

I now desire to call attention to an important feature of this locking means, namely, that when it is desired to remove the cover the pressure is released equally at each hook, this is important for the reason that it often happens that an attempt is made to open the cover without first removing the pressure and where the steam pressure is high, damage of serious consequence is liable to occur if the cover is loosened at one side more than at the other. With my device the pressure is reduced equally at each place and when it is sufficiently released to permit the steam to escape it will do so around the entire circumference.

It is not my intention that the cover should ever be removed while the pressure is excessive but with my device it can be done without any serious results.

Although I have shown and described a lock having six hooks engaging with the flange of the pot, it is obvious that I can use three only, in which case I will not employ the bars 25 but project the ends of the three levers 21 within the tubular member 7 where they will be directly engaged by the disk shaped member 13. This combination is to be used in cookers of the smaller sizes.

Having now described my invention or discovery and the best manner in which I contemplate constructing and using the same, what I claim is:

1. In combination, a container whose upper edge is outwardly tapered, an outwardly extending annular flange surrounding said container adjacent the top thereof, a cover having a tapered portion adapted to co-operate with the tapered portion of said container to form a steamtight seal, means for clamping the cover to the container, comprising a plurality of lugs equidistantly spaced about the periphery of said cover, levers pivotally attached to said lugs, the outer ends of said levers being provided with hooks adapted to engage beneath said flange, a central tubular stem on said cover, a plurality of slots in said stem adapted to receive the inner ends of said levers, said stem being internally threaded, a bolt threadedly connected with said stem and adapted to co-operate with the ends of the levers to move the same about the pivots and clamp the cover in place.

2. In combination a container, a cover removably secured thereto, a flange on said container, a plurality of pairs of levers pivotally mounted on said cover, hooks pivotally secured to the ends of said levers, said hooks being adapted to engage the lower side of said flange, the levers of each pair having their inner ends inclined towards each other, a bar pivoted intermediate its ends between the inner ends of each pair of levers, a pin passing through said pair of levers and through the outer ends of each of said bars and means for moving the inner ends of said bars downwardly and forcing the hooks upwardly against said flange whereby the cover is forced against the top of said container.

3. In combination a container, a cover removably secured thereto, a flange on said container, three pairs of levers pivotally mounted on said cover, hooks pivotally secured to the ends of said levers, said hooks being adapted to engage the lower side of said flange, the levers of each pair having their inner ends inclined towards each other, a bar pivoted intermediate its ends between the inner ends of each pair of levers, a pin passing through said pair of levers and through the outer ends of each of said bars and means for moving the inner ends of said bars downwardly and forcing the hooks upwardly against said flange whereby the cover is forced against the top of said container.

4. In combination, a container, a cover removably secured thereto, a flange on said container, three pairs of levers pivotally mounted on said cover, hooks pivotally secured to the ends of said levers, said hooks being adapted to engage the lower side of said flange, the levers of each pair having their inner ends inclined towards each other, a bar pivoted intermediate its ends between the inner ends of each pair of levers, a pin passing through each pair of levers and through the outer end of each of said bars, a tubular member secured to the cover near its center and projecting upwardly therefrom, slots in said tubular member, the inner ends of said bars projecting through said slots to the hollow space within said tubular member and means within said tubular member for moving the ends of said bars downwardly whereby the outer ends are moved upwardly and the hooks forced against the lower side of said flange and the cover forced against said container.

5. In combination, a container, a cover removably secured thereto, a flange on said container, a central tubular stem secured to the cover, said stem being internally threaded, threaded bolt-like member co-operatively connected to said stem, a handle secured to said bolt and adapted to rotate the same, a plurality of slots in the lower portion of said stem, a plurality of lugs secured in spaced relation about the periphery of said cover, a lever pivotally mounted on each lug, a hook on the outer end of said lever and adapted to engage said flange, and means extending through said slots and adapted to be engaged by said bolt for moving said levers about said pivots and for clamping the cover in place on the container.

In testimony whereof I affix my signature.

JOSEPH H. JACOBS.